United States Patent [19]

Lindem

[11] Patent Number: 5,662,568
[45] Date of Patent: Sep. 2, 1997

[54] SYMMETRICAL MULTI-AXIS LINEAR MOTOR MACHINE TOOL

[75] Inventor: Thomas Jules Lindem, Rockford, Ill.

[73] Assignee: Ingersoll Milling Machine Co., Rockford, Ill.

[21] Appl. No.: 440,416

[22] Filed: May 12, 1995

[51] Int. Cl.$^6$ .............. B23Q 3/157; B23B 39/00; B23C 1/02
[52] U.S. Cl. .............. 483/30; 408/234; 409/235
[58] Field of Search .............. 409/212, 202, 409/235, 191; 483/30, 36, 15; 318/575; 451/11, 64, 340, 162, 164; 408/234

[56] References Cited

U.S. PATENT DOCUMENTS

| | | | |
|---|---|---|---|
| Re. 31,288 | 6/1983 | Matsuzaki et al. | 29/27 C |
| 4,102,035 | 7/1978 | Voglrieder et al. | 29/568 |
| 4,505,464 | 3/1985 | Chitayat | 269/73 |
| 4,632,615 | 12/1986 | Yamamura | 409/235 |
| 4,761,876 | 8/1988 | Kosmowski | 29/568 |
| 4,809,422 | 3/1989 | Kitamura | 29/568 |
| 4,834,353 | 5/1989 | Chitayat | 269/73 |
| 4,890,241 | 12/1989 | Hoffman et al. | 364/513 |
| 4,893,398 | 1/1990 | Zimmer | 29/568 |
| 4,985,651 | 1/1991 | Chitayat | 310/12 |
| 4,987,668 | 1/1991 | Roesch | 409/212 X |
| 5,117,552 | 6/1992 | Babel | 483/36 |
| 5,152,645 | 10/1992 | Corsi | 409/235 |
| 5,314,397 | 5/1994 | Mills et al. | 483/30 |
| 5,321,874 | 6/1994 | Mills et al. | 29/33 |
| 5,346,345 | 9/1994 | Jerzycke et al. | 409/235 |
| 5,368,425 | 11/1994 | Mills et al. | 409/235 |
| 5,368,539 | 11/1994 | Mills et al. | 483/1 |
| 5,379,509 | 1/1995 | Mills et al. | 29/558 |
| 5,401,128 | 3/1995 | Lindem et al. | 409/132 |

FOREIGN PATENT DOCUMENTS

| | | | |
|---|---|---|---|
| 420735 | 4/1991 | European Pat. Off. | 409/235 |
| 6322 | 1/1985 | Japan | 409/235 |
| 729005 | 4/1980 | U.S.S.R. | 409/235 |

*Primary Examiner*—William R. Briggs
*Attorney, Agent, or Firm*—Fitch, Even, Tabin & Flannery

[57] ABSTRACT

A machine tool has a frame supporting a vertical gantry which is driven at the top and bottom sides of the gantry such that the opposed, normal magnetic forces between stator coils and magnets are substantially equal and are self-cancelling. This reduces normal magnetic forces that increase friction, and this provides symmetry along an X-axis. A spindle-carrying saddle travels in a vertical slot in the center of the gantry with left and right linear motors mounted on opposite sides of the gantry. The linear motors are identical so that opposed right and left-hand, normal magnetic forces are self-cancelling. This provides symmetry along the vertical Y-axis. A spindle and ram are mounted on the saddle and are driven by at least one linear motor to travel along the Z-axis. The symmetry and cancelling of normal, magnetic attractive forces reduces the weight and the amount of forces needed to accelerate the gantry in the X-direction and the saddle in the Y-direction. The preferred frame is a stationary, box-type structure which encompasses the gantry and spindle, and the frame provides an enclosed space protecting the linear motors.

28 Claims, 9 Drawing Sheets

SYMMETRICAL MULTI-AXIS LINEAR MOTOR MACHINE TOOL

FIELD OF THE INVENTION

The present invention relates to machine tools driven by linear motors along a plurality of axes and, more particularly, to a machine tool supported in a frame and driven by linear motors for high speed movement of the tool along at least three (3) mutually transverse axes.

BACKGROUND OF THE INVENTION

The present invention is directed to a machine tool having three (3) axes of movement and a working element moved along these axes by linear motors. The working element is capable of moving in a work zone. The present invention is thus applicable to various machines of this type; but for sake of brevity, the invention will be described in connection to a cutting tool machine having a cutting tool. However, the invention is not to be limited as to only covering cutting tool machines. U.S. Pat. No. 5,368,425 discloses a linear motor-driven, cutting tool machine, and as present in numerous conventional screw-driven cutting tool machines, a vertical column is mounted on a slide to travel in a horizontal X-axis direction and a vertically-movable slide is slidable vertically along the column in the Y-axis direction. A spindle carrying a tool is mounted on the slide for sliding horizontally in a Z-axis direction at a location spaced above the X-axis and normal to both the X and Y axes, respectively. Each of these three axes is typically stacked one on another, resulting in the axis driving forces being offset from the spindle and cutting tool, e.g., a milling cutter, for cutting a piece of steel. This asymmetrical arrangement of the driving forces relative to the axis of the cutting tool results in deflections in the machine structure and inaccuracies in the cutting process. This is true whether the driving force is supplied by a servomotor and ball screw/nut combination or by way of linear motor drives, as in the '425 Patent. This asymmetrical arrangement results in: 1) structural deflections due to working forces or acceleration/deceleration forces, 2) in bending as experienced in the cantilevered load of the spindle slide and spindle, and 3) in less stiffness per unit of mass due to the large mass needed to achieve the necessary stiffness.

U.S. Pat. No. 5,368,425 discloses a cutting tool machine having its large upright column mounted for traversing in the X-direction along a large stationary, heavy base that supports the column. The driving force from the linear motors is applied only to the lower end of the column to propel it in the X-axis direction. The large stationary base provides the horizontal alignment of the respective X and Z-axis movements of the column and of the spindle slide and its tool spindle that travel vertically in the Y-axis direction along a vertical wall of the massive column. The spindle travels in a direction of the Z-axis and is carried on a cantilevered or overhung slide that travels along the vertical column wall. Thus, the machine alignment is predicated on the foundation remaining stable. If a corner of the foundation sinks or becomes misaligned, then the horizontal axes will be misaligned. Because of the space needed to support the column at its bottom end, and the size of the tool-carrying slide, the tool spindle and tool could not reach the bottom of a workpiece easily. To overcome this, the foundation required a pit to be dug to lower the spindle to reach a bottom portion of the workpiece to machine the same. Such foundation pits are expensive, as are the large and often custom-sized, foundations for the kind of machine tools illustrated in this patent. Further, adding to the size of the foundation and to the size of the machine, per se, are the covers for the ways which are bellow-shaped and which are located at the ends of the ways. These bellow-shaped covers are located at positions on the machine base at the ends of the column travel in the X-axis; and hence, add to the overall length footprint of the machine. The covers keep chips and metallic dust from the ways and from being magnetically attracted to the linear motor parts.

To move the massive column in the X-axis in the machine disclosed in the aforesaid patent, there is a pair of linear motors with one-half of each linear motor being mounted on the stationary base and the other half being mounted on the X-axis carrier supporting the column. The one-half of each of these two motors on the column adds to its overall weight, and thereby requires more linear motor thrust for the column to be moved along the X-axis. In addition to this linear motor weight on the column, there is an attractive, magnetic force, i.e., a normal magnetic force component which, in this instance, is a downward magnetic force between the coils and magnets of these linear motors, e.g., 24,000 lbs. of downward force that causes an increase in friction that must be overcome to traverse the column-supporting carrier along the X-axis. If the column weighs 8,000 pounds, and a normal 24,000 lb. attractive, magnetic force is present, the latter adds significantly to the mass that needs to be overcome. The linear motors apply the thrust only to the bottom of the column. To resist deflection of the unsupported upper end of the column as the lower end accelerates, the column is formed with heavy structural members that add to the weight of the column. Hence, the linear motor force required to move the column at accelerations of one G or more is increased significantly from the force needed if the column were not driven only at its lower end, and if large no such attractive, magnetic, normal force was present.

Generally speaking, at the present time, it takes about one pound of thrust from the linear motor to move about one pound of mass. The larger the thrust needed, the larger linear motor weight that must be added to the column. Stated differently, the effect is cumulative because the more force needed to be obtained from the linear motors, the heavier the linear motor is in weight, e.g., the coils on the column carrier and this weight increase adds more weight requiring more thrust.

In the linear motor cutting machine, disclosed in the aforesaid patent, the massive column is constructed of lightweight materials and has a skeletized structure in order to reduce its weight; and thereby, reduces the linear thrust force needed to accelerate it rapidly and to reduce deflection of the upper end of the column relative to the lower end of the column, which is being propelled by the linear motors. The column is formed with an aluminum braced, trapezoidal-shaped frame and with an aluminum skin covering the skeleton frame and with a reinforcing ladder of frame elements thereon to add rigidity and stiffness to the column. Because one is machining metals, a high degree of stiffness is needed for the column which carries the cutting tool slide and spindle in order to obtain the precision needed for the cut workpiece surfaces.

In the aforesaid patent, the spindle-carrying slide was overhung or cantilevered on the column to move vertically along a Y vertical axis. The column carried on three sides thereof, permanent magnets for three (3) linear motors used to accelerate and decelerate the spindle slide. The stator coils of the motors were on three sides of this slide and located closely adjacent to and traveling along the three, associated vertical rows of permanent magnets on the column. Three linear motors were needed to accelerate and decelerate the spindle slide vertically, and these three linear motors generated normal attractive, magnetic forces directed inwardly along three sides of the column. The spindle-carrying slide was cantilevered on the column and the weight of the ram and spindle as well as the applying of the thrust only to the side of the slide adjacent the column could cause bending and deflection and sufficient structural members had to be used in the slide to offset any such bending or deflection. The three linear motors not only applied their thrust to only one side of the slide adjacent the column wall, but these linear motors also increased the friction between the spindle slide and the column that had to be overcome. Thus, if 18,000 lbs. of normal attractive, magnetic force existed between the column and the ram, this increased frictional force generated thereby had to be overcome to accelerate the spindle slide in the Y-axis direction and the slide structure had to be reinforced with structural members to resist bending and deflection of the remote end of the cantilevered slide as the motor thrust was applied to the near side of the slide at the column wall.

The size and weight of this spindle slide were quite large in order to support the three rows of coils for the three Y-axis motors and to provide a stiff, cantilever support for the slide and spindle thereon to provide the cutting tool with the necessary stiffness against the workpiece. The spindle slide, illustrated in this patent, had a ribbed structure that was quite large in cross-section and carried an outer aluminum skin about the ribs. The large size of the spindle slide meant that the tool could not be brought down as low as desired relative to the workpiece because the spindle slide's height below the spindle limited the amount of downward travel of the spindle.

SUMMARY OF THE INVENTION

In accordance with the present invention, a machine tool for advancing a rotary cutting tool along at least three (3) mutually transverse axes and driven by linear motors is provided, which overcomes the aforementioned problems of the prior art.

In accordance with the present invention, the machine tool has linear motor drives distributed symmetrically relative to at least two axes to minimize deflections that cause cutting process deviations and inaccuracies. By having the machine elements driven symmetrically on opposite sides of the cutting spindle axis, there has been achieved a reduction in structural deflection, a lighter weight machine having a high stiffness per mass unit, a balancing or cancelling of normal magnetic forces that would increase friction, and an elimination of bending from a cantilevered load. In accordance with the present invention, the structural member or gantry driven in the X-axis direction is driven by linear motors at both the upper and lower ends thereof, rather than only at the bottom thereof; and the spindle-carrying slide is driven in the Y-axis direction by linear motors on opposite sides of the slide rather than only at one side of the slide. By balancing these driving forces on opposite sides of the movable X and Y-axis structures, rather than applying these driving forces at one side of the movable X and Y-axis structures, as in the machine of the aforesaid patent, the structures may be of lighter weight construction by eliminating structural members added to resist deflection or bending of the side remote from the force application side. Hence, the present invention provides lighter weight X and Y-axis structures relative to the massive weights of the vertical column and of the cantilevered spindle slide, and reduces the friction by cancelling the effect of attractive forces. The X and Y linear motors are symmetrically arranged on opposite sides of the tool-carrying spindle to drive the X and Y moving machine elements with forces applied symmetrically on opposite sides of the tool-carrying spindle; and this results in a minimum of structural deflection from the motor attractive forces, acceleration forces and the cutting forces. This symmetrical machine structure eliminates much of the bending experienced in the asymmetrical machine structure from the cantilevered loads. Preferably, the linear motors are distributed optimally throughout the machine structure to balance loads and forces about the tool-carrying spindle, thereby minimizing the cutting deviations and inaccuracies. By eliminating the need for many structural members used in the asymmetrical machines to resist bending and/or deflection, the symmetrical machine can be lighter in weight with a higher stiffness per unit of mass. Thus, it is possible to achieve higher accelerations and decelerations with less linear motors.

In accordance with the present invention, the linear motor machine includes a slide-carrying gantry in which the linear motors for moving the gantry are mounted on opposite sides thereof to provide equal propelling forces on two sides of the gantry and to provide an attractive magnetic force balancing principle in which a reduced net downward force exists between the gantry and the underlying frame support member. Preferably, this is achieved by having the linear motor drive on one side of the gantry, e.g., the bottom side, pushing on the bottom side of the gantry in the X-direction and attracting downwardly and by having the linear motor drive on the other top side, pushing on the top side of the gantry in the X-direction and attracting oppositely, e.g., upwardly. This is in contrast to the aforementioned machine in which the linear motors for shifting column all push on the lower end of the column and all attract in the same downward direction. Likewise, it is preferred that the tool-carrying slide or saddle (hereinafter called a "saddle") be driven by linear motors mounted on opposite sides thereof, e.g., left and right vertical sides, rather than applying the motor driving force to only one side of the slide. Placing the linear motors on opposite sides of the saddle provides propelling forces in the Y-direction on opposite sides of the saddle and provides oppositely-directed, attractive motor forces in opposition with one another. This achieves a force-balancing principle that results in a reduced net magnetic, normal force, preferably about a zero (0) net magnetic, normal force in either the left or right direction. This is in contrast to the aforesaid patent wherein the illustrated machine has three (3) linear motors for moving the slide, all providing propelling forces on one side of the slide and all exerting inwardly-directed, magnetic normal forces against three sides of a vertical column.

In the gantry, linear motor machine of the present invention, the tool-carrying spindle is supported on an underneath saddle that spans a pair of adjacent, vertical gantry frame members, rather than being cantilevered on one vertical wall of the column, as disclosed in the aforesaid patent. The underneath support of the saddle allows a large reduction in the size thereof relative to the size of the cantilevered ram. The reduction in size, and also of weight, results in less weight that needs to be moved in the Y-axis direction and less weight to be moved in the X-axis direction. The reduction in weight and size results in lower cost and less motor thrust needed. Indeed, the number of linear motors can be reduced from six or eight, in the aforesaid '425 Patent, to five, illustrated herein.

In accordance with another aspect of the invention, the machine frame is box-like in configuration with upper and lower parallel, horizontal frame members and a pair of spaced vertical frame members joined to ends of the upper and lower frame members. There is no large foundation necessary for alignment of the machine; rather the frame members themselves provide the alignment. In theory, the machine tool can be rotated through 90°, 180° or 270° and still perform equally as well, which is not true of the column stack machine disclosed in the aforesaid patent.

In the illustrated and preferred embodiment, the machine frame is a stationary box-type structure which encompasses the sides, rears, top and bottom of the movable, linear motor-driven, gantry traveling in the X-direction, the linear motor-driven saddle movable along the gantry in the Y-direction, and the linear motor-driven spindle movable along the saddle in the Z-direction. In this preferred embodiment, the gantry is supported on and is driven by top and bottom linear motor drives spaced on opposite sides of the spindle. Preferably, the upper and lower linear motors are substantially identical. Thus, the forces applied to the top and bottom of the gantry are substantially equal; and the opposed, normal magnetic forces between stator coils and magnets are self-cancelling. Thus, there is symmetry about the X-axis.

In this illustrated and preferred embodiment of the invention, the spindle-carrying saddle is mounted to travel vertically in a slot at the vertical centerline of the gantry. The saddle is driven by left and right-hand, linear motors mounted on the gantry at opposite vertical sides of the slot. The linear motors are identical and are positioned so that the forces applied to the opposite sides of the saddle are substantially equal and so that the opposed right and left-hand, normal magnetic forces are self-cancelling. Thus, the Y-axis has symmetry as well as along the X-axis.

The spindle and ram are mounted on the saddle to travel in the Z-direction. If desired, a linear motor may be mounted both above and below the same to drive the ram and spindle in the Z-direction and to provide symmetry. It is preferred, however, that a single linear motor be used either above or below the ram and extending in the Z-direction to reduce the weight of the ram and to provide an attractive "preload" on the ways of the ram and saddle for greater stability of the spindle.

DETAILED DESCRIPTION OF THE PREFERRED EMBODIMENTS

As shown in the drawings for purposes of illustration, the machine 10 has a frame 12 that supports a gantry 38 movable in a horizontal X-axis direction and slidable along an upper supporting, frame member 20 and a lower supporting, frame member 22. The gantry 38 carries a tool-carrying slide or saddle 56 that travels vertically in the Y-axis direction. The saddle 56 carries a reciprocating ram 68 and tool spindle 78 which has a tool 11 thereon for cutting a workpiece 30 mounted on a workpiece support 34. The gantry 38, saddle 56 and ram 68 are driven by linear motors, generally designated 108, and each having permanent magnets 110 and coil stator sections 112.

Figure 2:
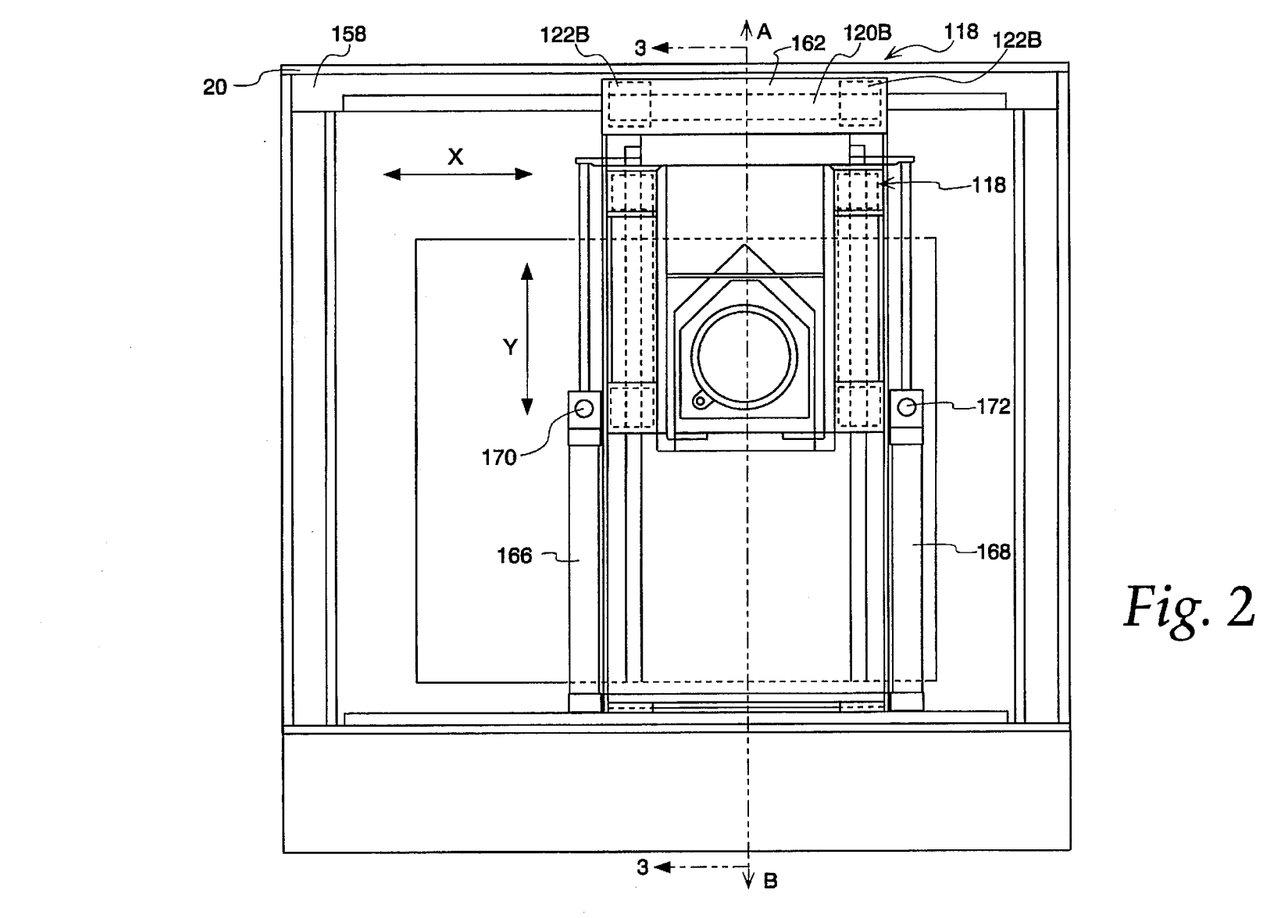
FIG. 2 is a front elevational view of the machine tool of FIG. 1 having a portion of the front face of the box frame removed to illustrate the vertical gantry, the saddle, and the ram and spindle arrangement.

In accordance with the present invention, upper and lower driving forces are applied to the upper and lower ends 38a and 38b of the gantry 38 by an upper linear motor 108b secured to the upper, horizontal frame member 20 and a lower linear motor 108a secured to the lower, horizontal frame member 22. As best seen in FIG. 2, the saddle 56 and the tool-carrying spindle 78 are both mounted between the upper and lower linear motors, 108b and 108a, respectively, so that there is symmetry about the spindle 78. This is in contrast to the asymmetrical machine disclosed in the aforesaid '425 Patent where the linear motors are all mounted at the bottom of the column and all push on the lower end of the column. In the machine 10, shown in FIGS. 2 and 3, substantially equal forces from linear motors exert propelling forces at the top of the gantry 38 adjacent the upper frame member 20 and at the bottom of the gantry 38 adjacent the lower frame member 22. Because of the force application at the top and bottom of the gantry 38 on opposite sides of the spindle-carrying ram 68, the gantry 38 need not have the structural members therein to resist bending and deflecting as did the massive column of the '425 Patent, which had the tool spindle located above all of the linear motors in the machine base for driving the column in X-axis direction.

Figure 3:
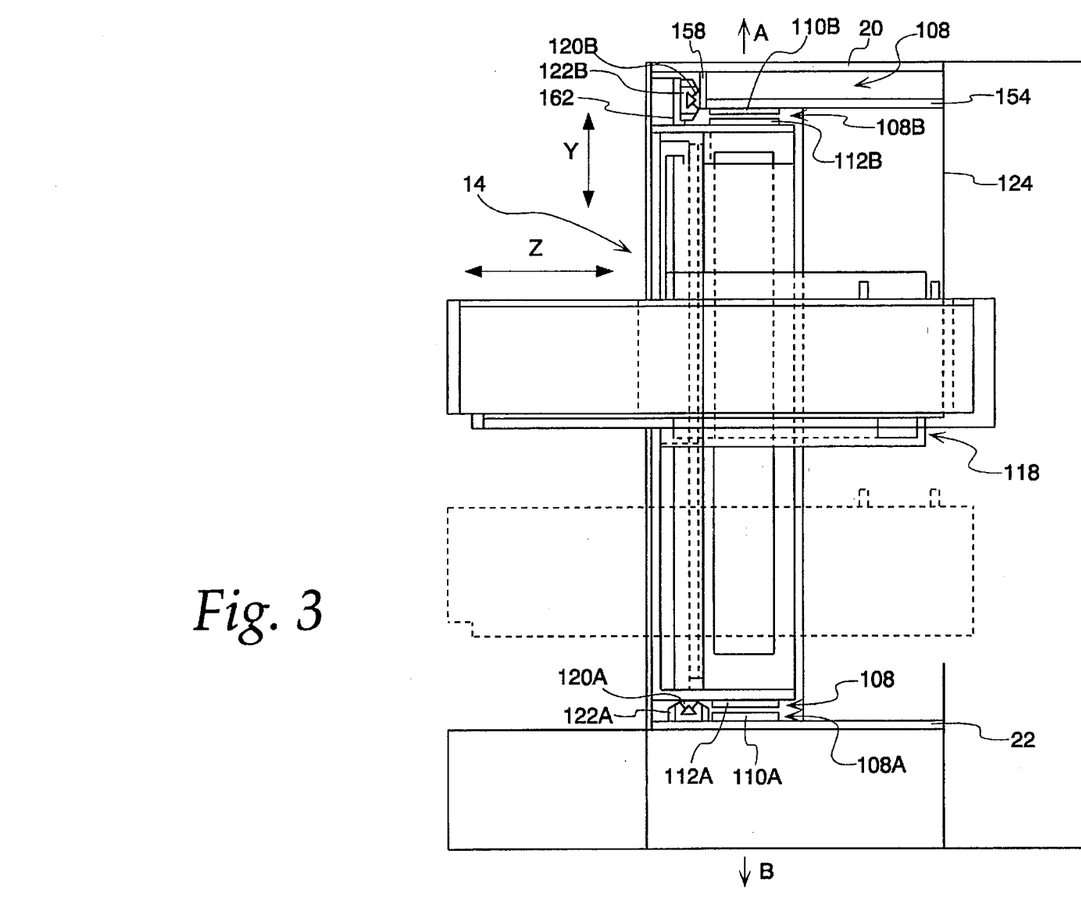
FIG. 3 is a cross-sectional view taken along line 3—3 of FIG. 2 illustrating the vertical gantry, the saddle, and the ram and spindle and showing movement in phantom of the ram along the Y-axis.

Also, in accordance with an important aspect of the invention, the attractive magnetic normal force, 6,000 pounds per linear motor, are offsetting in that the upper linear motor 108b pulls upwardly with a 6,000 pound force, indicated by the arrow A in FIGS. 2 and 3, and the lower linear motor 108a pulls downwardly with a 6,000 pound force as indicated by the arrow B in FIGS. 2 and 3. The net magnetic, normal force is preferably about zero because the upper and lower linear motors are substantially identical in size and field strength, and are controlled simultaneously in the same manner. In the machine tool of the '425 Patent, all of the X-direction linear motors exerted downward forces, e.g., 24,000 pounds of downward force. This created additional frictional resistance and the need for heavier structural members in the column to resist deflection.

In accordance with the invention, the saddle 56 is supported on its left and right sides by vertical gantry frame members 40 and 42, each of which carries vertically-disposed portions of linear motors 108c and 108d (FIG. 10) on opposite sides of the tool-carrying spindle 78. That is, the linear motor drives are mounted on opposite sides of the spindle 78 and are symmetrical to the spindle 78 to exert equal, vertically-directed forces on opposite sides of the saddle 56. Thus, the saddle 56 is supported on opposite sides thereof and the propelling force in the Y-direction is applied on opposite sides of the saddle 56 by the left and right-hand linear motors 108c and 108d. This is in contrast to the spindle-carrying slide in the '425 Patent which had one side thereof mounted to slide along the column and in which the spindle-carrying slide was cantilevered supported. The linear motors for the Y-axis movement of the tool-carrying slide, as in the '425 Patent, were all mounted on the column wall so that the propelling force was along the one side of the slide, i.e., the side of the slide adjacent column. Because each of the three linear motors in the '425 Patent machine pulled inwardly with 6,000 lbs. of normal, attractive magnetic force, there was increased friction. More importantly, the structure of the cantilevered spindle slide had to be strengthened by a heavy framework of ribs in order to resist bending and deflection of the spindle slide in order to provide the stiffness needed for the cutting tool on the spindle. The saddle 56 can be much lighter and provide a higher stiffness to mass ratio. The lighter weight saddle 56 allows faster acceleration and the use of less linear motor thrust forces.

Thus, it will be seen that the spindle 78 may be mounted symmetrically with respect to the X-axis and Y-axis motors resulting in a minimum of structural deflection, an elimination of bending as experienced in cantilevered loads, and a cancellation of normal attractive, magnetic forces. While it is possible to mount linear motors both above and below the spindle 78 and on the saddle 56, it is preferred to use only a single linear motor drive located beneath the spindle 78 and to use the 6,000 lb. normal downward, attractive force to preload the ram 68 into tight engagement with the ways on the spindle.

Figure 13:
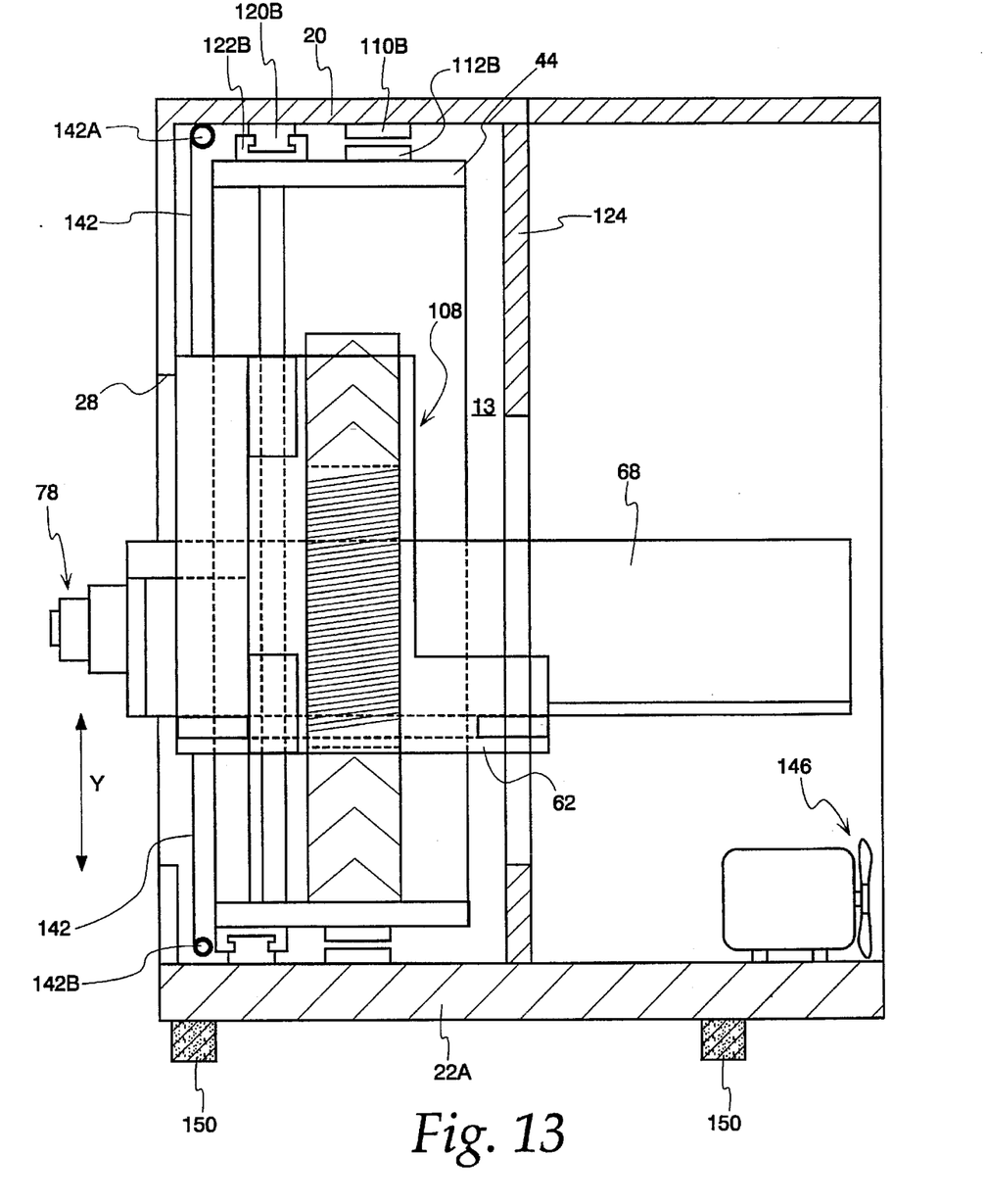
FIG. 13 is a sectional, side elevation view similar to FIG. 3, illustrating an alternative embodiment location for the gantry top guides and linear motor.

In the '425 patented machine, a very large foundation with a pit was needed to support the base and to provide alignment in the X-axis direction for the stacked movable X, Y and Z movable elements. If a corner of the foundation dropped, this alignment was lost. Herein, the square or rectangular frame receives its alignment from the steel frame members 16, 18, 20 and 22 that encompass the gantry, the saddle and the spindle-carrying ram, hereafter referred to in a group as movable members 14. Preferably, the frame 12 is formed from steel with the height of the machine in the Y-direction as measured between the members 20 and 22 being equal to or less than the width of the machine in the X-direction, measured between members 16 and 18 to provide a very stable box-frame support for the movable members 14 as they slide along their respective axes of movement. The machine can be shipped, ready to install and it need not be set up and leveled on a massive foundation as was the '425 patented machine. As seen in FIG. 13, vibration isolators 150 may be positioned between the bottom frame member 22 and the floor, and the machine should be ready to use without leveling or a specialized foundation therefor. Theoretically, the bottom frame member 22, as well as the rest of the frame 12, could be rotated through 90°, 180° or 270° and still perform the same because of the symmetry of the machine and because of the box-like nature of the frame.

The box-shaped frame 12 and the symmetrical location of the X-axis motors 108b and 108a above and below the X-axis movable member (gantry), allows a much smaller geometric size or footprint for the illustrated machine than the machine shown in the '425 Patent. In the vertical column machine of the prior art, the ends of the ways had large bellow-shaped covers that extended beyond the ways and added significantly to the length of the machine. In this invention, the box-shaped frame 12 is enclosed in a containment housing that is pressurized by air from a fan to keep metal dust particles and chips from the ways and from the linear magnetic motors. The shorter length is of particular importance where a plurality of machine tools 10 are disposed side-by-side in a transfer line.

Figure 10:
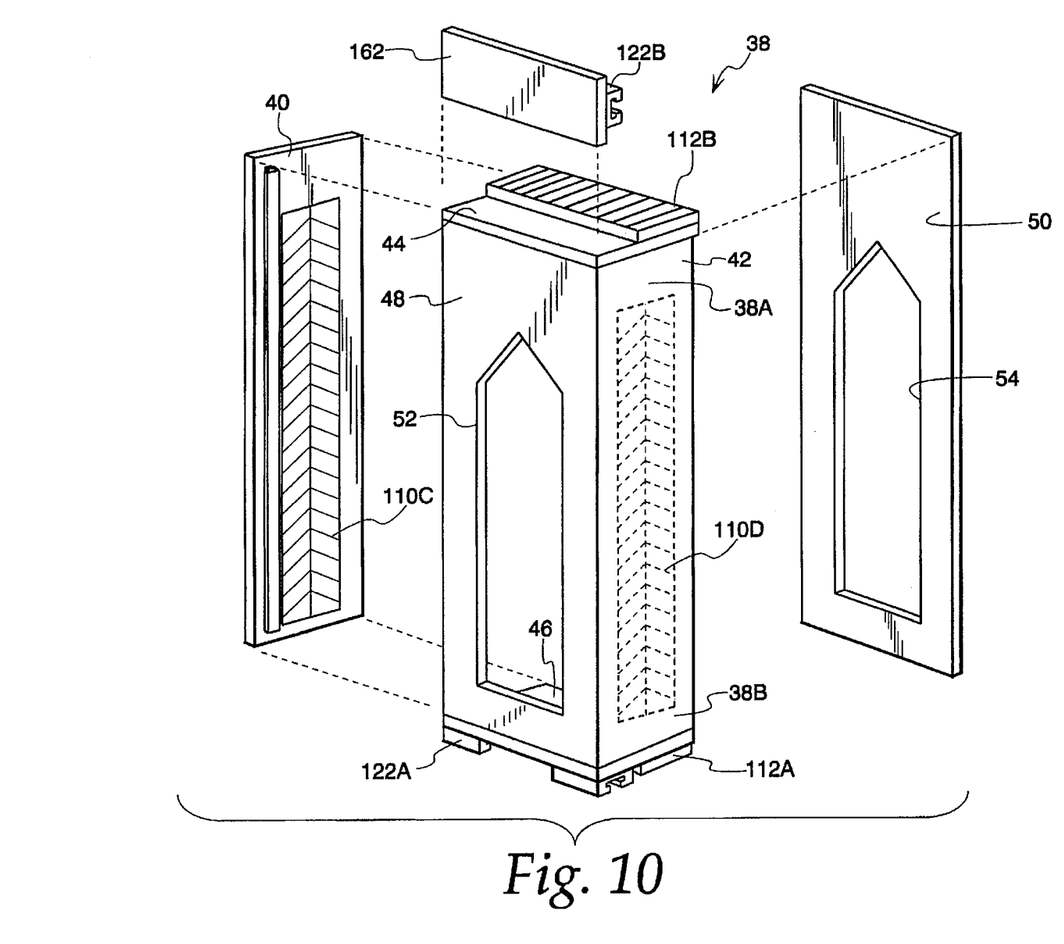
FIG. 10 is an enlarged, exploded perspective view of the vertical gantry.

Referring now in greater detail to the illustrated embodiment of the invention, and specifically to FIG. 10, a vertical gantry 38 as used as the movable member 14 movable along the X-axis is illustrated. The vertical gantry 38 is driven for movement along the X-axis and is mounted in the frame 12 to extend between the top and bottom members, 20 and 22, thereof. The vertical gantry 38 includes parallel elongate side trusses 40 and 42 joined to top and bottom walls 44 and 46, respectively. Front and rear walls 48 and 50, respectively, are provided between the trusses 40 and 42 and top and bottom walls 44 and 46, each having elongate slots 52 and 54 therein which define the Y-axis of travel for the cutting tool 11 and allow the cutting tool 11 to be advanced therethrough along the Z-axis.

Figure 11:
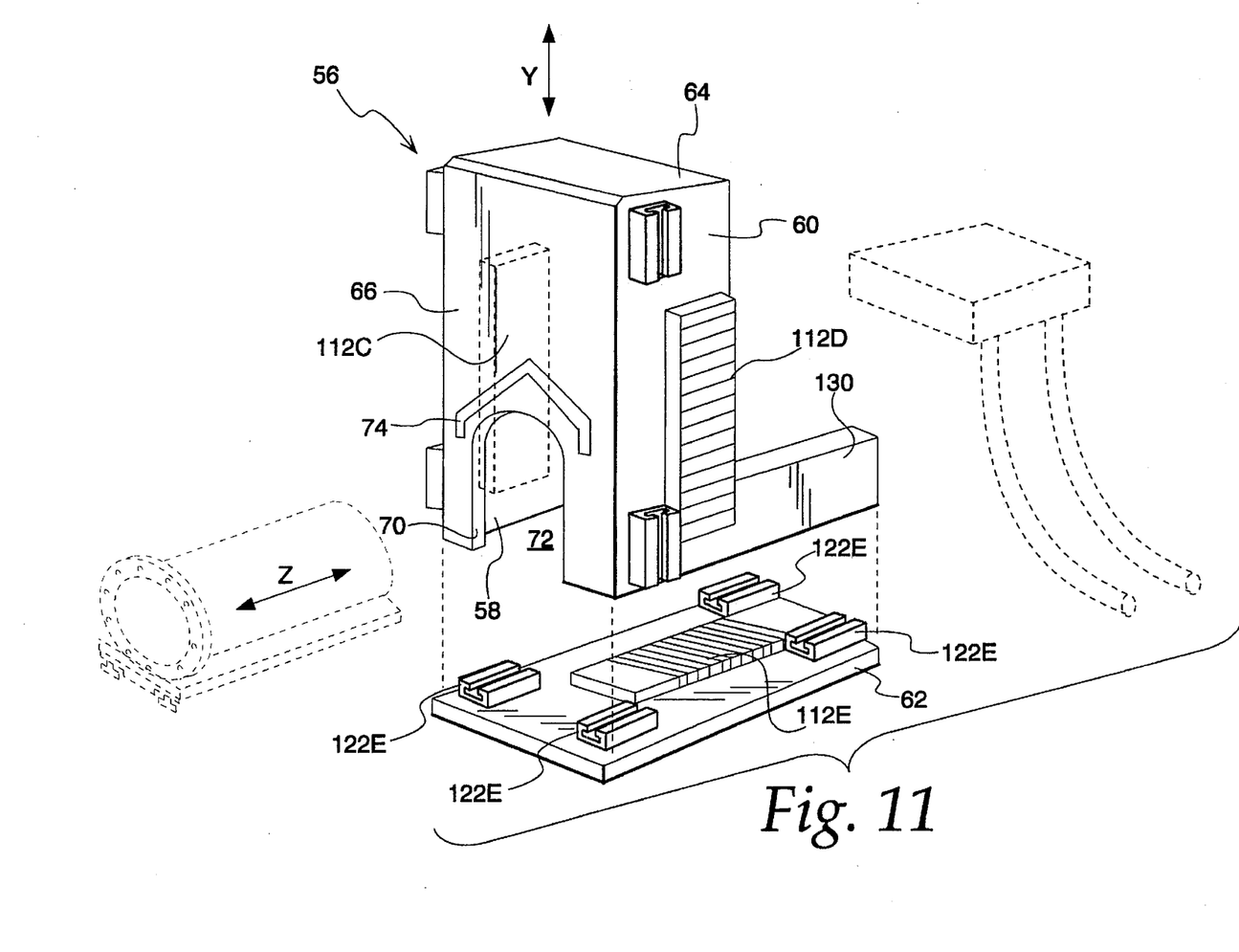
FIG. 11 is an enlarged, exploded perspective view of the saddle and coil stator sections of linear motors associated therewith and illustrates the detachable bottom plate and stator coils subassembly.

Turning to FIG. 11, a saddle 56 as used as the member 14 movable along the Y-axis is illustrated. The saddle 56 has a pair of laterally spaced, parallel sidewalls 58 and 60 each having an L-shaped profile. The saddle 56 is mounted for vertical sliding movement in the gantry 38 between the trusses 40 and 42. The gantry side-trusses 40 and 42 are spaced at a distance slightly greater than the distance between the saddle sidewalls 58 and 60 to provide a close fit between the gantry trusses 40, 42 and saddle sidewalls 58, 60 as the saddle 56 is carried by the gantry 38 and is driven for sliding movement along the Y-axis in the gantry 38. The saddle 56 further includes a bottom, detachable web wall 62 in the form of a flat plate which extends between the sidewalls 58 and 60. The top wall 64 and a forward wall 66 complete the framing for the saddle 56 and form a cradle for carrying a ram 68 as will be more fully described herein. The front wall 66 of the saddle 56 is cut out as at 70 to provide an arched opening 72 through which the ram 68 can extend when driven along the Z-axis. Thus, the saddle 56 supports the ram 68 from beneath the ram 68 eliminating the cantilever support as shown in the '425 Patent and the undue deflection stresses created thereby.

Figure 4:
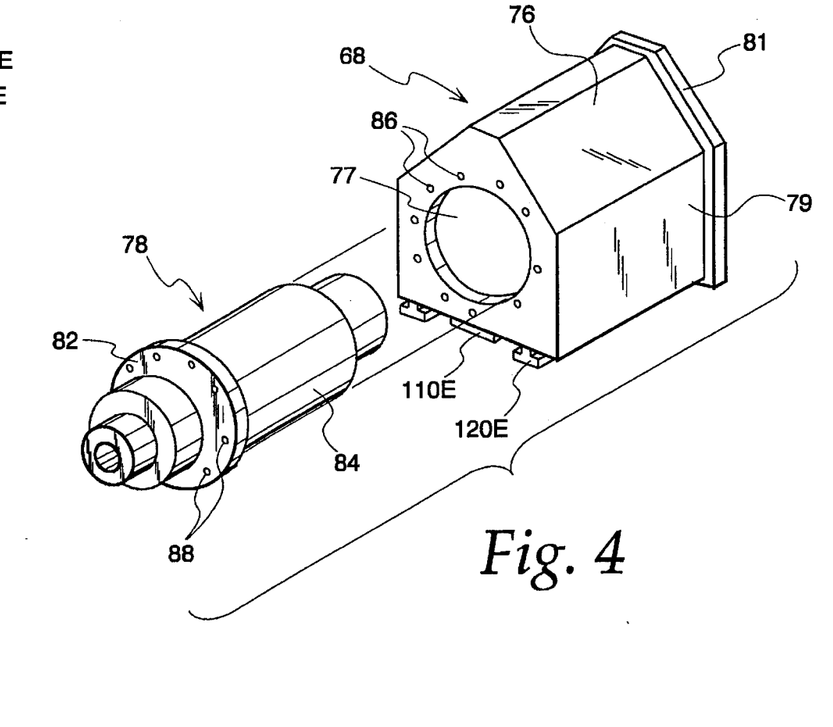
FIG. 4 is an enlarged, exploded, perspective view of the ram and spindle assembly including permanent magnets of a linear motor associated with the ram and a wiper element.

The structure of the ram 68 will now be described with reference to FIGS. 4–8. The ram 68 includes a hollow body 76 for supporting a spindle 78 therein. The body 76 has an annular bore 77 extending therethrough. The outer surface 79 of the body 76 can have a number of different shapes when viewed in cross-section. The preferred polygonal shape for the ram 68 is shown in FIG. 4 as a pentagon. The exact shape of the pentagon itself can vary (FIG. 8), as will be more fully described herein. As seen in FIG. 4, with the preferred pentagon-shaped ram 68, a resilient plastic wiper element 81 can be utilized with the wiper 81 having an similar cross-sectional shape as the ram 68 to closely fit around the ram outer surface 79 and limit the travel of metallic chips and dust from being carried into the internal space 13 as the ram 68 slides along the Z-axis. The ram 68 further includes a series of holes 86 in the front face 87 thereof around the bore 77. The spindle 78 has an enlarged, annular forward flange 82 formed integrally with a cylindrical body 84 extending rearwardly therefrom with the flange 82 including a series of circumferentially spaced holes 88 therethrough. The cylindrical body 84 has a diameter sized so that it tightly fits within the bore 77 and is fixed therein by aligning holes 86 and 88 on the ram front face 87 and spindle forward flange 82 and inserting attachment members, such as threaded bolts (not shown), through the holes.

Figures 5, 6, 7:
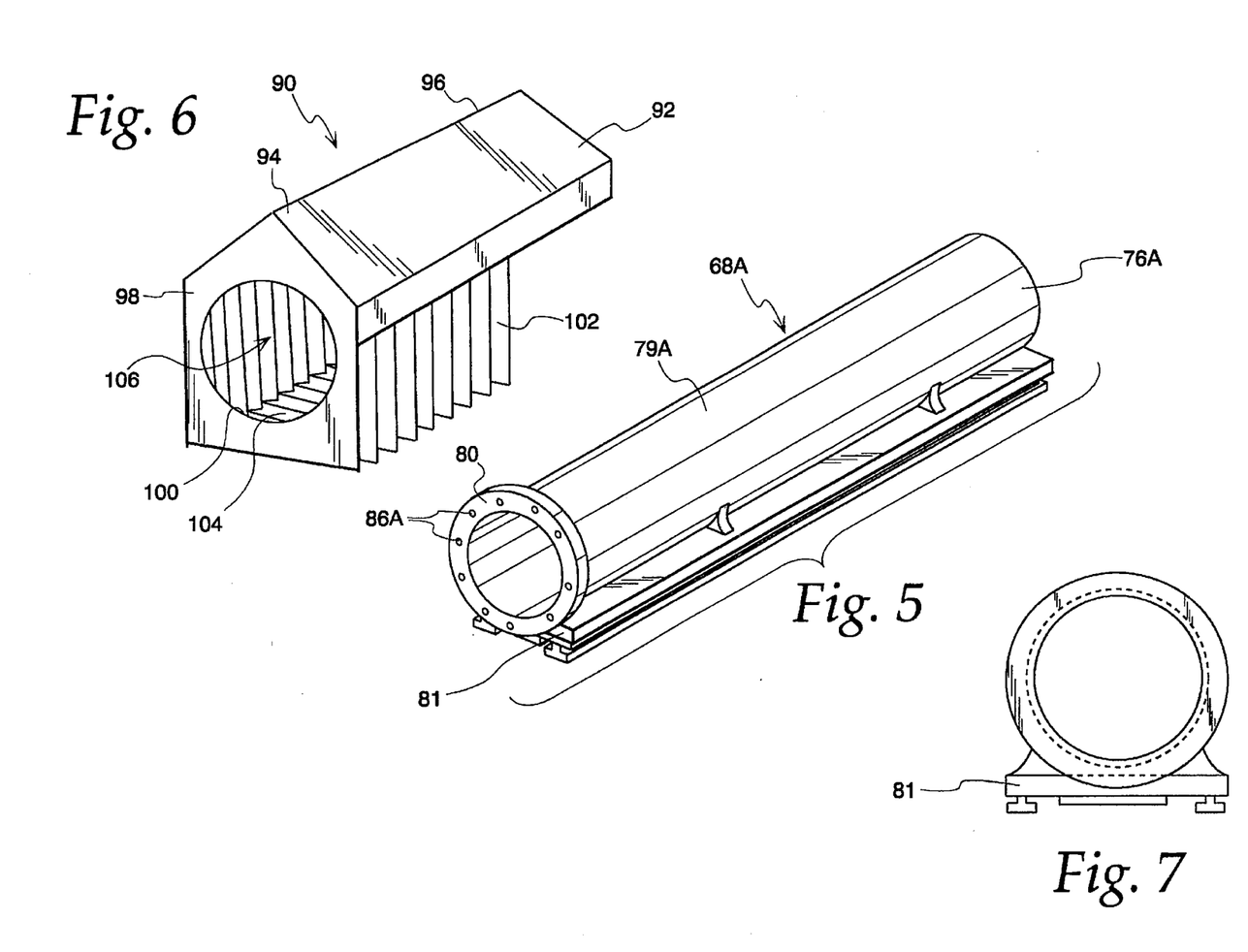
FIG. 5 is an enlarged, exploded perspective view of an alternatively shaped ram.
FIG. 6 is an enlarged perspective view of a "doghouse" and bellow assembly for the ram of FIG. 5.
FIG. 7 is a front elevational view of the ram of FIG. 5.

In another form, a ram 68a includes a hollow body 76a having a cylindrical shape surface 79a is provided as seen in FIG. 5. The ram 68a has an enlarged, annular front flange 80, with the annular flange 80 having an inner diameter slightly less than the diameter of the bore 77 and a series of holes 86a therearound, as best seen in FIG. 7. The annular flanges 80 and 82 cooperate to secure the spindle 78 in the ram 68. The cylindrical body 84 has a diameter slightly less than the inner diameter of the annular front flange 80 such that the spindle 78 can be fit into the ram bore 77 with the cooperating front and forward flanges 80 and 82 being secured to one another as by aligning holes 86a and 88 therein, respectively, and attaching, as previously described. The ram body 76a is attached to a bottom support plate 81 to mount the linear motor portion associated with the ram 68a for driving the ram 68a along the Z-axis.

The ram 68a can be further provided with a protective "doghouse" housing 90 for guarding portions of the ram 68a which extend outwardly from the frame 12 through the opening 28 as the ram 68a is driven along the Z-axis to protect the portions of ram 68a which extend outwardly from the frame internal space 13 during sliding movement along the Z-axis. Accordingly, the wiper element 81 is not necessary when the housing 90 is employed. The housing 90 can have a steel roof 92 having a forward end 94 and a rearward end 96. At the forward end 94, a vertical front plate 98 is provided having an entry hole 100 centrally cut therein and of sufficient diameter such that the ram 68 can slide therethrough. Side bellows 102 and bottom bellows 104 are attached to the roof 92 and the front face 66 of the saddle 56 with the bellows 102 and 104 and the roof 94 cooperatively defining an expansible chamber 106 in which the ram 68 can be advanced along the outside of the saddle 56. The housing 90 can be attached to the cylindrical body 76 by connecting the bottom of the roof 92 at the forward end 94 thereof to the flange 80 as by bolting or the like. As the roof 92 extends longitudinally further along the ram body 76 than the bellows, a peaked cut-out section as at 74 is provided above the arched opening 72 and corresponds to the shape of the roof 92 to allow it to extend therethrough as the ram 68 slides along the Z-axis. Similarly, the slot 52 in the front wall 48 of the gantry 38 is cut so that the front plate 98 along with the bellows 102, 104 and steel roof 92 can slide therethrough. On the other hand, the front wall 66 of the saddle 56 limits the distance to which the housing 90 can extend into the saddle 56 as movement to the right in FIG. 10 is permitted until the front plate 98 of the housing 90 reaches the front wall 66 of the saddle 56. In this manner, the expansible chamber 106 alternatively collapses and expands as the ram moves in and out of the saddle 56 along the Z-axis.

As described above, it can be seen that the movable members 14 including the horizontal ram 68, the saddle 56 and the gantry 38 are all nested one within the other for three-axis movement of the tool 10. More specifically, the gantry 38 carries the saddle 56 and the ram 68 and spindle 78 along the X-axis, the saddle 56 carries the ram 68 and spindle 78 along the Y-axis, and ram 68 only carries the spindle 78 along the Z-axis.

To drive the movable members 14 for three-axis movement of the tool 10, linear motors 108 are employed. The linear motors 108 each have a stator coil section 110 and a row of permanent magnets 112. The permanent magnets 112 of the linear motor 108 are arranged in a row and are bonded to the movable members 14 and the frame 12 with spaces between magnets in a row being filled with epoxy. A thin strip of a protective non-magnetic, metallic material covers each row of magnets 112.

The linear motors 108 can be any motor which operates based on attractive magnetic forces producing a thrust driving force such that there is no contact between the driving (stationary) and driven (moving) members. For example, the linear motors 108 can be brushless DC motors and each may have maximum thrust force of 2,000 pounds. The linear motors 108 are generally positioned between the movable members 14 and the movable member in the X-axis (the gantry 38) and the frame 12. The control for the linear motors 108 is integrated into the machine frame 12 and is operable as by control panel 116. A position feedback (not shown) is utilized and can include optical, mechanical or laser sensors used to detect the position of the movable members and send signals to allow the control to energize only those coils needed to drive the member along its axis of movement, as is known in the art.

Similar to the linear motors 108, bearing structure 118 in the form of cooperating anti-friction, elongate linear rails 120 and rail receiving trucks 122 are positioned between the movable members 14 and the movable member in the X-axis (the gantry 38) and the frame 12 to support and guide sliding movement thereof in the X, Y and Z-axes as they are driven by the linear motors 108. The rails 120 and trucks 122 provide their guiding and supporting functions through roller or ball bearings, or through surfaces coated with low coefficient of friction materials, such as Teflon.

Figure 1:
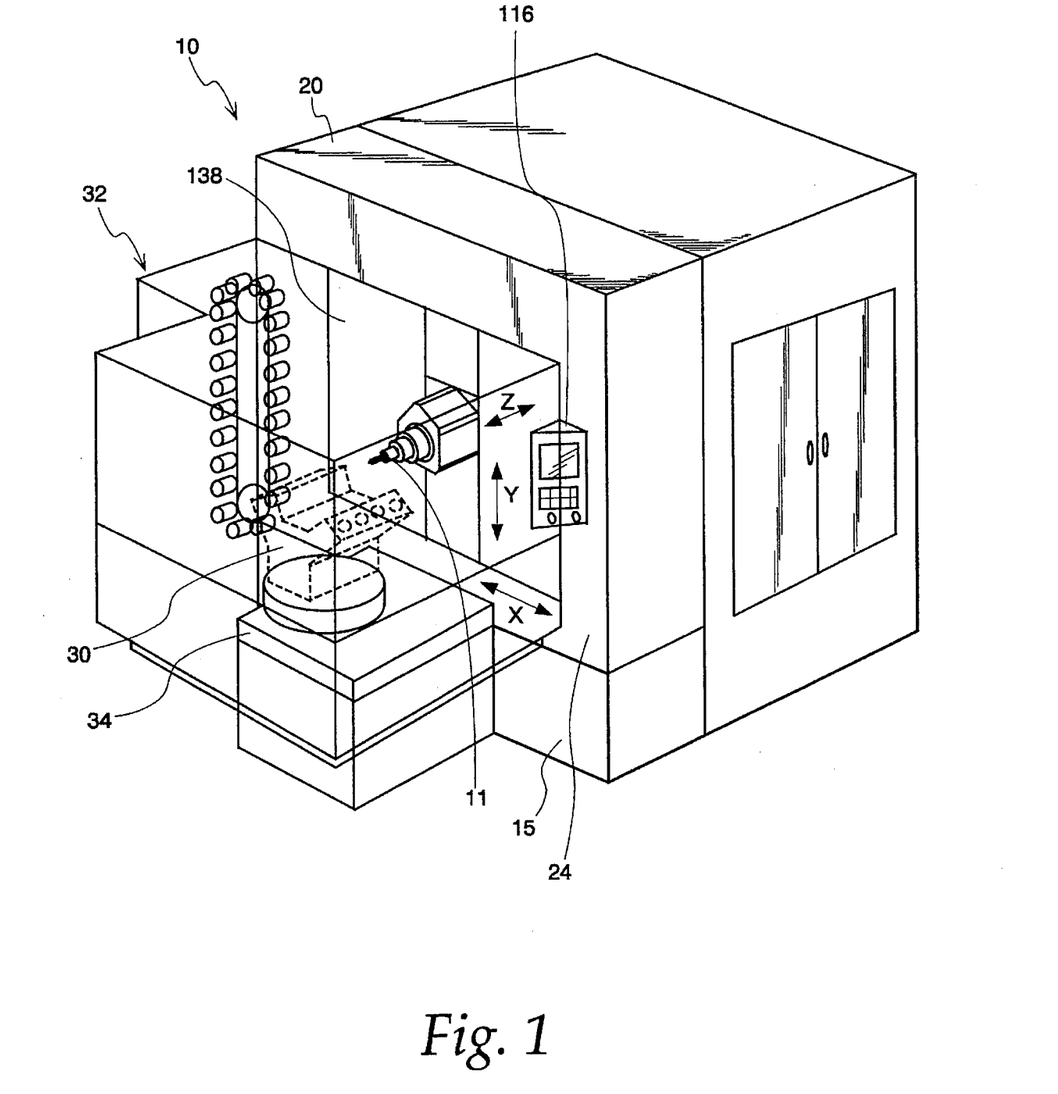
FIG. 1 is a perspective view of a machine tool movable in three axes and illustrating a box frame for supporting the three axis machine tool according to the invention.
Figure 12:
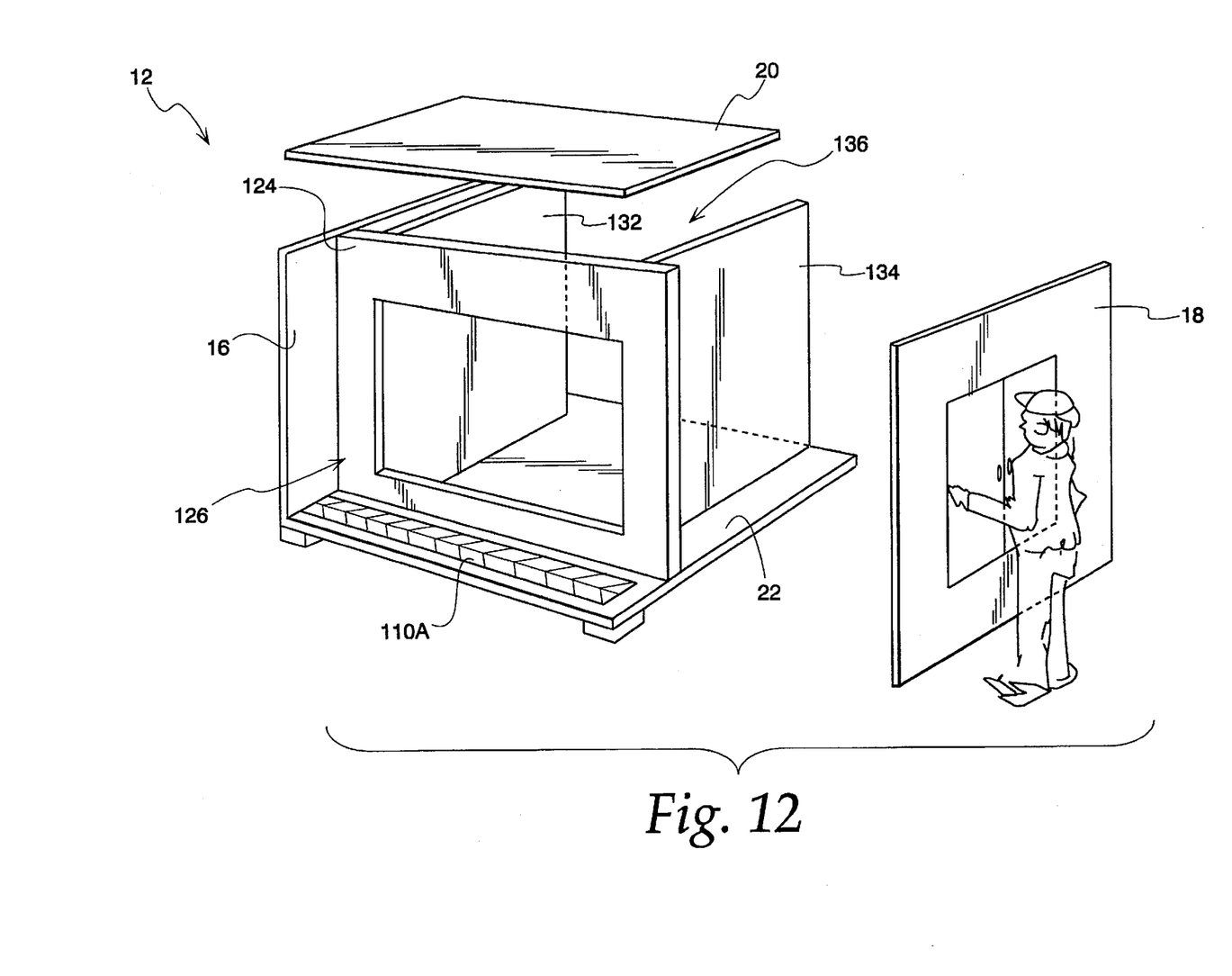
FIG. 12 is a partially exploded perspective view of the box frame for housing the vertical gantry, the saddle, and the ram and spindle assembly.

Returning to the box frame 12, the configuration thereof will be more fully described with reference to FIGS. 1, 12 and 13 although, as will be apparent to one skilled in the art, the exact configuration of the box frame 12 can be modified while still housing and supporting the movable members 14 for sliding movement along the X, Y and Z-axes. The box frame internal space 13 can be divided into front and rear regions 126 and 136, respectively, by an intermediate partition wall 124 which extends between the side members 16 and 18. The front frame panel 24 can be attached to a T-shaped base 15 for the box frame 12 at the junction of the arm and leg of the "T" and extends upwardly from the base and is attached to the machining housing 32 for the support 34 about the rear thereof. The panel 24 extends parallel to the intermediate wall 124 and has a central, rectangular-shape cut out 26 to fit around the housing 32 and to allow the ram 68 to extend into the housing 32 along the Z-axis to engage a workpiece 30 therein. The intermediate partition wall 124 along with the side members 16 and 18, front panel 24 and the top and bottom members 20 and 22 define a front gantry region 126 in the box frame internal space 13. Similar to the front panel 24, the intermediate partition wall 124 has a rectangular shaped cut-out section therein which allows for the bottom leg 130 of the L-shaped side walls 58 and 60 of the saddle 56 to extend therethrough during movement of the saddle along the Y-axis, and allows the ram 68 to extend therethrough as the ram 68 moves along the Z-axis.

Two parallel side support panels 132 and 134 can be spaced inwardly from the box frame side members 16 and 18, respectively, and extend from the intermediate partition wall 124 towards the rear of the box frame 12. The intermediate partition wall 124, the side panels 132 and 134 and the top and bottom members 20 and 22 cooperatively define the rear region 136 in the box frame internal space 13 into which the saddle bottom legs 130 and ram 68 can project, as previously described. Further, the rear region 136 provides an enclosure for housing the various services and support equipment, such as a tank, pump and chiller, for supplying the linear motors with cooling water.

The box frame 12 can be sealed at the forward central opening 28 thereof as by structure for blocking the opening while allowing the ram 68 to extend therethrough during its sliding movement along the Z-axis. The sealing structure can take the form of X and Y-curtains 142 or baffles which allow the saddle 38 and ram 68 to move in the X and Y-axes while still blocking the opening 28 around the ram 68. The curtain 142 includes an upper curtain roll 142a above the saddle and a lower curtain roll 142b at the bottom of the frame and below the saddle. The upper and lower curtains roll and unroll respectively as the saddle moves vertically. The rear of the machine can be sealed by sheet metal to complete the rear region enclosure. The box frame internal space 13 can be pressurized by a positive pressure means in the form of a fan 146 to prevent dust and workpiece chips generated during a machining operation from entering the internal space. The fan 146 can be placed in the box frame rear region 136 and supplied with ambient filtered air. The pressurized air from the fan 146 can effectively isolate the internal space from any cast-iron or steel dust or chips generated from the workpiece which might be attracted to the magnetics of the linear motors 108 which could adversely affect operation of the same.

Referring to FIG. 13, it is also possible for the base 15 as described earlier to be removed while providing the frame 12 with a thicker bottom member 22a which is directly mounted to a support surface. Vibration-absorbing resilient pads 150 can be attached to the bottom frame member 22a to isolate the machine and the support surface one from the other so that vibrations in either are not transmitted from one to the other. Because of the symmetrical box-frame construction of the machine, the alignment of the machine does not depend upon the foundation such that only three support pads 150 need be utilized to provide the machine with an effective three-point mounting to the support surface.

To drive the vertical gantry 38 along the X-axis in the box frame 12, a pair of opposed linear motors 108a and 108b are provided, as seen in FIG. 3. By providing for top and bottom driving of the gantry 38, the deflection loads caused by driving the gantry solely from the bottom is substantially obviated. As seen in the '425 Patent, the bottom driving of the long freestanding column causes a deflection near the free top end of the column due to the concentration of drive forces at the bottom of the column thereby causing a deflection lag at the top as the column is driven. In the box-frame machine, the coil stator section 112a of the bottom gantry linear motor 108a is mounted on the gantry bottom member 46 while the row of permanent magnets 110a is mounted along the X-axis on the bottom frame member 22 in the front gantry region 126 (FIG. 12). Adjacent the coil stator section 112a mounted on the frame bottom member 22 are a pair of linearly aligned rail-receiving trucks 122a (FIG. 10). Aligned therewith is a slide rail 120a positioned adjacent the magnets 110a so that the gantry 38 is supported and guided for sliding movement along the X-axis by the cooperating rail and trucks, 120a and 122a, respectively.

The top linear motor 108b is positioned at or near the top of the gantry 38 and frame 12. As seen in FIGS. 2 and 3, in the preferred embodiment, a horizontally extending frame member 154 is provided in the front gantry region 126 parallel and spaced from the top frame member 20. The frame member 154 extends from the intermediate wall 124 towards the front of the frame 12 and is attached to a vertical wall portion 158 between the front panel 24 and intermediate wall 124 extending between the wall portion 154 and the top frame member 20. To drive the vertical gantry 38 from the top as well as the bottom of the gantry, the coil stator section 112b is mounted to the gantry top wall 44 and the row of permanent magnets 110b is aligned therewith along the X-axis and is mounted to the bottom of the horizontal wall portion 154. Proximate the linear motor 108b, a rail 120b and trucks 122b are provided to guide and support the gantry 38 near the top thereof as it is advanced along the X-axis. The gantry 38 includes a vertical flange 162 mounting the linearly arranged pair of trucks 122b (FIG. 10). The vertical wall portion 158 of the frame 12 mounts the slide rail 120b such that it is in alignment with the trucks 122b for sliding movement therein. In an alternative arrangement, both the trucks 122b and the coil section 112b are mounted in side-by-side relation on the gantry top wall 44 with the rail 120b and row of permanent magnets 110b being aligned therewith mounted on the top frame member 20, as illustrated in FIG. 13. As will be apparent to one skilled in the art, the arrangement of the cooperating rail 120b and trucks 122b and the linear motor 108b can be altered, such as by placement thereof on the intermediate wall 124, as long as they remain near the top of the gantry to provide for top driving of the same. In this manner, the attractive magnet force in the top and bottom linear motors 108a and 108b are self-canceling so as to limit structural deflections as caused by the unbalanced magnetic forces as applied in the machine of the '425 Patent.

Similarly, with the saddle 56 mounted as a balanced load in the gantry 38 between the gantry side trusses 40 and 42 for sliding travel therealong in the Y-axis, linear motors 108c and 108d can be positioned between the saddle sidewalls 58 and 60 and the gantry side trusses 40 and 42, respectively, to balance the magnetic forces applied between the gantry 38 and saddle 56 about the Y-axis. More specifically, each gantry side truss 40 and 42 mounts one-half of the linear motors 108c and 108d, respectively, which in the preferred form is a row of permanent magnets 112c and 112d extending along the Y-axis (FIG. 10). The respective coil stator sections 112c and 112d are mounted on the saddle sidewalls 58 and 60, respectively, to drive the saddle 56 and the ram 68 carried thereby along the Y-axis. Thus, the saddle 56 is symmetrically driven from either side thereof about the Y-axis while simultaneously providing a support beneath the ram 68 in the form of the detachable web wall 62, thereby eliminating any overhung or cantilevered loads as seen with the ram, slide and column configuration in the '425 Patent.

To counterbalance the saddle 56 as it moves in the Y-axis, a pair of counterbalance cylinders 166 and 168 are attached between the gantry 38 and the saddle 56 such that when the linear motors 108c and 108d are not activated, the saddle 56 remains stationary in the gantry 38 along the Y-axis. The cylinders 166 and 168 can be, for example, either air or hydraulic cylinders and each include a spring brake 170 and 172, respectively, as is known in the art. Thus, when there is a loss of power and pressure is removed from the counterbalance cylinders 166 and 168, the spring brakes 170 and 172 are activated to maintain the saddle 56 in position along the Y-axis.

As previously mentioned, the saddle 56 includes a detachable bottom web wall 62 for providing the ram 68 with a cradle or support thereunder as it slides along the Z-axis. The web wall 62 can be attached to the main portion of the saddle 56, as seen in FIG. 11, by any variety of well-known attaching means such as by threaded holes and bolts which also allows the web wall 62 to be adjustable so as to correct for any variations in tolerances between the ram 68 and saddle 56.

To drive the ram 68 along the Z-axis, it is preferred to utilize a single linear motor 108e with one-half of the motor 108e on the web wall 62 and the other half below the ram 68. Preferably, the coil stator section 112e is mounted on the bottom web wall 62 with a pair of linearly arranged trucks 122e positioned on either side thereof. A row of permanent magnets 110e is mounted beneath the ram 68 and is flanked by two parallel rails 120e with the magnets 110e and rails 120e being aligned with the coils 112e and the trucks 122e, respectively, to allow the ram 68 to be driven for sliding movement along the Z-axis and supported by the web wall 62. With this arrangement, the strong attractive force provided by the linear motor 108e produces a preload on the rails 120e and trucks 122e to provide the spindle 78 with greater stability as the ram 68 is reciprocated along the Z-axis.

Due to the symmetrical box frame configuration with the bulk of the mass of the machine in the stationary steel frame 12 and the application of balanced driving forces about the gantry 38 and saddle 56, the movable elements 14, i.e., the gantry 38, the saddle 56 and the ram 68 can all be relatively light in weight and still be formed from a material having a high degree of material stiffness, such as steel, to be accurately driven for high-speed movement by their respective linear motors 108 so that the tool 10 can be advanced at speeds of at least 1500 inches per minute and at an acceleration or deceleration of at least 1G.

Figure 8:
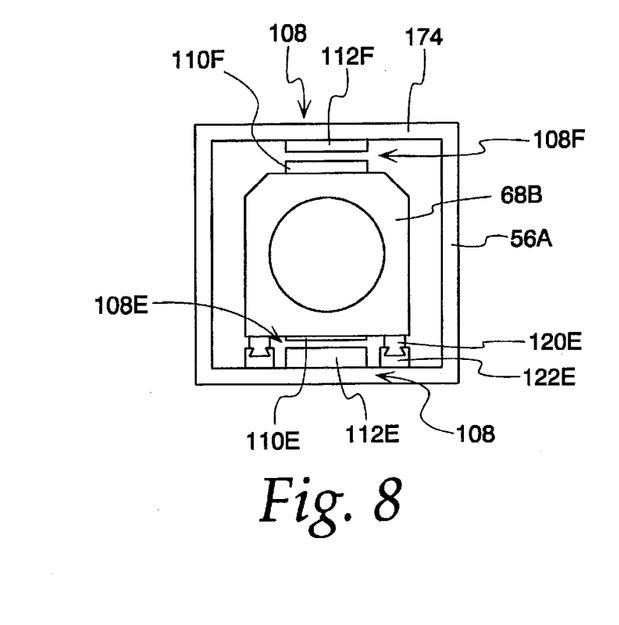
FIG. 8 is a front elevational view of an alternative saddle and ram, similar to the ram of FIG. 4, with the ram being driven by linear motors at the top and bottom of the ram.
Figure 9:
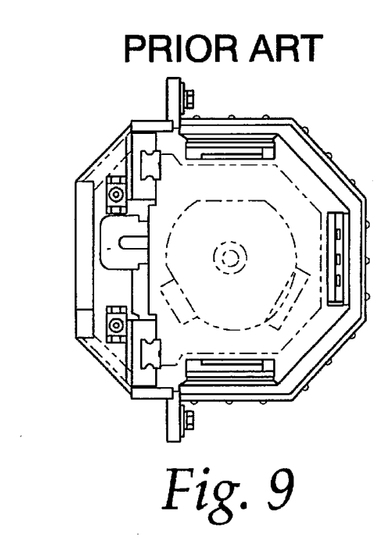
FIG. 9 is a sectional end view of a prior art cantilevered ram and linear motors associated therewith.

In another embodiment, balanced magnetic drive forces are applied to the ram 68 by utilizing a slightly modified pentagonal shape, as illustrated in FIG. 8, wherein the flat top surface thereof is extended in the X-direction so that it is adapted to mount a row of permanent magnets 110f thereon. The modified ram 68b utilizing a top mounted linear motor 108f also employs a slightly modified saddle construction wherein the saddle 56a forms a square-shaped frame about the circumference of the ram 68b so that the top horizontal member 174 of the saddle 56a can mount a coil pack 112f thereon in alignment with the magnets 110f to drive the ram 68b from both the top and bottom thereof.

As is apparent, the use of linear motors 108 in the box-frame machine tool described herein provides for flexibility in the design of its movable members 14 as the linear motors 108, unlike conventional ball-screw motors or the linear motors in the machine of the '425 Patent, can be distributed throughout the machine tool box-frame 12 to balance forces about the various axes of movement. As such, the exact placement of the motors 108 and their components, i.e., the magnets 110 and coil section 112, can be varied in accordance with the force and load balancing principles described herein. Thus, with symmetrically arranged movable members and drive forces, improved accuracy, stiffness, speed and acceleration can be obtained over conventional machine tools.

What is claimed is:

1. A machine tool for advancing a tool, such as a rotary cutting tool, along at least three mutually transverse axes comprising:

a spindle having a tool mounted thereon;

a frame to support the spindle and cutting tool while cutting and being advanced along the transverse axes;

a vertical gantry mounted in frame for slidable movement in a first axis relative to the frame;

a saddle mounted on the gantry and carried therewith and mounted for slidable movement along a second axis perpendicular to the first axis and along the vertical gantry;

a ram carried by a portion of the saddle for movement along a third axis perpendicular to the second axis and carrying the spindle and rotary cutting tool for movement along the third axis;

a first linear drive having at least one linear motor having portions mounted on the gantry and mounted on the frame and extending in the direction of the first axis for moving the gantry relative to the frame along the first axis;

a linear saddle drive for moving the saddle along the gantry and along the second axis;

a first linear motor in the linear saddle drive having portions mounted on a first side of the gantry and on a first side of the saddle and each extending in the direction of the second axis;

a second linear motor in the linear saddle drive having portions mounted on a second side of the saddle and a second side of the gantry and each extending in the direction of the second axis;

the ram and the portion of saddle carrying the ram being disposed between the first and second linear motors of linear saddle drive with the saddle portion splitting the first and second motors and applying loads to the gantry on the opposite sides of the saddle portion; and a third linear drive having at least one linear motor for moving the ram and spindle along the third axis and supported by the spindle and ram and saddle.

2. The machine tool of claim 1 wherein the frame includes top and bottom frame members which are vertically spaced at a first predetermined distance and includes side frame members which are parallel and laterally spaced at a second predetermined distance with the first predetermined distance being approximately equal to or less than the second predetermined distance.

3. The machine tool of claim 1 wherein the frame, gantry, saddle and ram are formed from steel.

4. A machine tool for advancing a tool, such as a rotary cutting took, along at least mutually transverse axes comprising:

a spindle having a tool mounted thereon;

a frame having a first set of top and bottom frame members and a second set of side frame members joined to define a central opening and to support the spindle and cutting tool while cutting and being advanced along the transverse axes;

a vertical gantry connected to at least two frame members for slidable movement in a first axis relative to the frame;

a saddle mounted on the gantry and carried therewith and mounted for slidable movement in a second axis perpendicular to the first axis along the vertical gantry between the top and bottom frame members;

a ram carried by the saddle for movement along a third axis perpendicular to the second axis and carrying the spindle and rotary cutting tool along the third axis;

a first linear drive having at least one linear motor for moving the gantry relative to the frame members along the first axis and supported by the gantry and first set of side frame members;

a second linear drive having at least one linear motor for moving the saddle along the gantry and along the second axis and supported by the gantry and saddle;

a third linear drive having at least one linear motor for moving the ram and spindle along the third axis and supported by the spindle and ram and saddle, the frame members defining an internal space with the gantry and saddle mounted relative to the frame in the internal space and the frame includes means for substantially sealing and pressurizing the internal space to allow the ram and spindle to extend beyond the internal space while limiting workpiece chips generated and coolant used at the tool and workpiece interface from entering the internal space during a machining operation.

5. The machine tool of claim 4 wherein the sealing and pressurizing means comprises baffles for substantially blocking the central opening while allowing the ram to extend therethrough and a positive pressure means to supply air to pressurize the internal space.

6. The machine tool of claim 4 wherein the gantry includes top, bottom and side walls and the saddle includes spaced side walls and a bottom web wall extending therebetween to form a cradle for supporting the ram.

7. The machine tool of claim 6 wherein the gantry side walls have a first predetermined spacing and the saddle side walls have a second predetermined spacing slightly less than the first predetermined spacing to closely fit between the gantry side walls during sliding movement of the saddle in the second axis.

8. The machine tool of claim 6 wherein the linear motors each have a row of permanent magnets cooperating with a coil section and the first linear drive comprises a first pair of symmetric linear motors having magnetic force attractions in opposite directions to offset their respective forces.

9. The machine tool of claim 8 wherein the second linear drive comprises a second pair of symmetric linear motors each being positioned between the gantry side walls and corresponding saddle side walls, respectively, and having magnetic force attractions in opposing directions to offset one against the other.

10. The machine tool of claim 6 wherein the ram includes a bottom support plate with the third linear drive comprising a linear motor positioned between the ram bottom plate and saddle bottom web wall for sliding movement of ram in the third axis.

11. The machine tool of claim 6 including bearing means to guide the sliding movement of the gantry, saddle and ram caused by their respective linear motors.

12. The machine tool of claim 11 wherein the bearing means includes cooperating anti-friction slide rails and rail receiving trucks with the slide rails and trucks positioned between a pair of gantry walls and a pair of frame members, respectively.

13. The machine tool of claim 12 wherein the ram includes a box-shaped body defining a spindle receiving bore and having slide rails mounted thereon, and means to limit the travel of workpiece chips generated and coolant used at the tool and workpiece interface during a machining operation from entering into the machine tool.

14. A box assembly for driving a tool along a plurality of mutually transverse axes, the box assembly comprising:
    a spindle capable of receiving a tool;
    a box frame defining an internal space having a top and a bottom wall extending between laterally spaced sides defining a forwardly facing opening;
    a vertical gantry extending between the top and the bottom wall mounted for slidable movement relative to the frame along a horizontal X-axis extending between the laterally spaced sides adjacent to the opening, the gantry having a front face therebetween forming an elongate central vertical slot adjacent the frame opening;
    carriage means for mounting the spindle for sliding movement in two directions perpendicular to the X-axis, one direction being along a vertical Y-axis coincident with the vertical slot with the carriage means further defining the other direction along a horizontal of movement extending through the slot; and
    linear motor drive means associated with the vertical gantry and carriage means capable of causing a tool to be advanced at a speed of at least 1,500 inches/minute and at an acceleration or deceleration of at least 1 G along the X, Y and Z-axis with the frame, gantry and carriage means being formed from a material having with a high level of material stiffness.

15. The box assembly of claim 14 wherein the frame, vertical gantry and carriage means are formed from steel and have a predetermined natural structural frequency and the linear drive means includes a motor drive circuit having a preselected operating frequency range with the operating frequency range being preselected such that the predetermined natural structural frequency is greater than the preselected operating frequency range of the motor drive circuit.

16. The box assembly of claim 14 wherein a plurality of resilient vibration absorbing pads are attached to the box frame to mount the frame to a support surface and isolate the box assembly and support surface from each other.

17. The box assembly of claim 16 wherein three vibration pads are attached to the frame bottom wall for three-point mounting of the box frame to a support surface.

18. The box assembly of claim 14 wherein the carriage means includes a hollow ram for carrying the spindle therein and a saddle with the ram being mounted on the saddle for sliding movement along the Z-axis and the saddle being symmetrically mounted about the spindle between the gantry trusses for sliding movement of the saddle, ram and spindle along the Y-axis.

19. The box assembly of claim 16 wherein the linear motor drive means comprises at least first and second linear motors mounted between the gantry and walls of the box frame, respectively, to provide magnetic attractive forces in opposite directions to offset one another.

20. The box assembly of claim 19 wherein the linear motor drive means further includes at least third and fourth linear motors mounted between the gantry trusses and saddle to symmetrically drive the saddle and ram along the Y-axis equally from either side of the gantry.

21. The box assembly of claim 20 wherein the linear motor drive means further includes a fifth linear motor mounted between the ram and saddle to drive the ram and spindle along the Z-axis.

22. A machine tool comprising:
    a rotary spindle having a cutting tool mounted thereon;
    a frame having side frame members defining a central opening;
    a vertical gantry extending parallel to the side frame members and mounted for slidable movement on the frame;
    a saddle mounted on the gantry and carried therewith and mounted for slidable movement along the gantry;
    a ram carried by a portion of the saddle and mounted for slidable movement through the central opening and carrying the spindle and rotary cutting tool through the opening;
    a first linear drive mounted on the frame and having an upper linear, magnetic motor extending in a first direction for propelling the gantry with magnetic force and applying an upwardly-directed force to the gantry;

the first linear drive mounted on the frame and having a lower linear, magnetic motor extending in the first direction and parallel to the upper linear motor for propelling the gantry with magnetic force and applying a downwardly-directed force to gantry to oppose and offset the upwardly-directed force from the upper linear motor;

a second linear drive having right and left linear, magnetic motors extending vertically on opposite sides of the saddle portion for exerting magnetic force attractions to propel the saddle;

the right linear, magnetic motor exerting an attractive force on the right side of the saddle portion;

the left linear, magnetic motor exerting an attractive force on the left side of the saddle portion to offset the rightwardly-directed attractive force of the right linear motor; and a third linear drive having one or more motors having a stator coil section and permanent magnet section for moving the ram and spindle.

23. The machine tool of claim 22 wherein the third linear drive comprises a single linear motor mounted beneath the ram and spindle.

24. The machine tool of claim 23 wherein the linear motors are capable of moving the gantry, saddle and ram to cause a tool to be advanced at a speed of at least 1,500 inches/minute and at an acceleration or deceleration of up to at least 1 G with the frame, gantry and carriage means being formed from steel to provide them with a high level of material stiffness.

25. The machine tool of claim 22 wherein the third linear drive comprises a pair of linear motors each having a stator coil section and permanent magnet section mounted on opposite sides of the ram for moving the ram and spindle with magnetic force attractions being in opposite directions to provide symmetry.

26. A linear motor machine tool having a rotatable tool movable along at least three mutually transverse axes;

a box-like frame having four metal frame members joined in a box shape including a lower frame member for resting on a floor support surface without being attached to a heavy foundation;

vibration members between the lower frame member and a floor support surface to isolate the machine from vibrations to or from the floor support surface;

a gantry mounted between a first pair of opposite frame members;

a symmetrical, linear, gantry drive for the gantry having a first linear, gantry drive, magnetic motor mounted on a first frame member and a first side of the saddle for driving the gantry to travel along a first axis;

a second linear, gantry drive, magnetic motor in the symmetrical linear gantry drive mounted on a second frame member parallel to and opposite of the first frame member and mounted on a second side of the saddle for driving the gantry to travel along the first axis;

the magnetic forces of the first and second linear, magnetic motors being in opposite directions and offsetting against one another and providing substantial symmetry relative to the first axis;

a spindle-carrying slide mounted on the gantry for travel along a second axis perpendicular to the first axis;

a symmetrical linear slide motor drive for driving the spindle-carrying slide along the second axis;

a first linear, magnetic motor in the symmetrical linear slide motor drive mounted on the gantry and on the slide located on a third side of the gantry for driving the gantry to travel along the second axis;

a second linear, magnetic motor in the symmetrical linear, slide motor drive mounted on the gantry and on the slide on a fourth side of the gantry parallel to and opposite of the third side of the gantry to drive the slide to travel along the second axis;

the magnetic forces of the first and second linear motors of the linear slide motor drive being in opposite directions and offsetting against one another and providing substantial symmetry relative to the second axis;

carriage means mounted on the slide and supporting the spindle to travel along the slide along a third axis, which is perpendicular to the second axis; and a linear drive for the carriage means having at least one linear magnetic motor for moving the carriage means and the spindle thereon along the third axis.

27. The machine tool of claim 26 wherein the box-like frame is oriented to have the slide travel vertically along a vertical second axis, and the gantry is oriented to travel horizontally along a horizontal first axis.

28. The machine tool of claim 26 wherein the box frame may be rotated 90° to orient the slide to travel horizontally along a second horizontal axis, and the gantry is oriented to travel vertically along a vertical first axis.

* * * * *

UNITED STATES PATENT AND TRADEMARK OFFICE
CERTIFICATE OF CORRECTION

PATENT NO. : 5,662,568
DATED : September 2, 1997
INVENTOR(S) : Thomas J. Lindem

It is certified that error appears in the above-indentified patent and that said Letters Patent is hereby corrected as shown below:

<u>IN THE CLAIMS:</u>

Column 14, line 42, change "took" to read --tool--.

Signed and Sealed this

Sixth Day of January, 1998

Attest:

BRUCE LEHMAN

*Attesting Officer*  *Commissioner of Patents and Trademarks*